Aug. 31, 1937.  T. C. PERRY  2,091,522
SEAM OR DEFECT DETECTOR FOR SHEET MATERIAL
Filed July 30, 1936  2 Sheets-Sheet 1
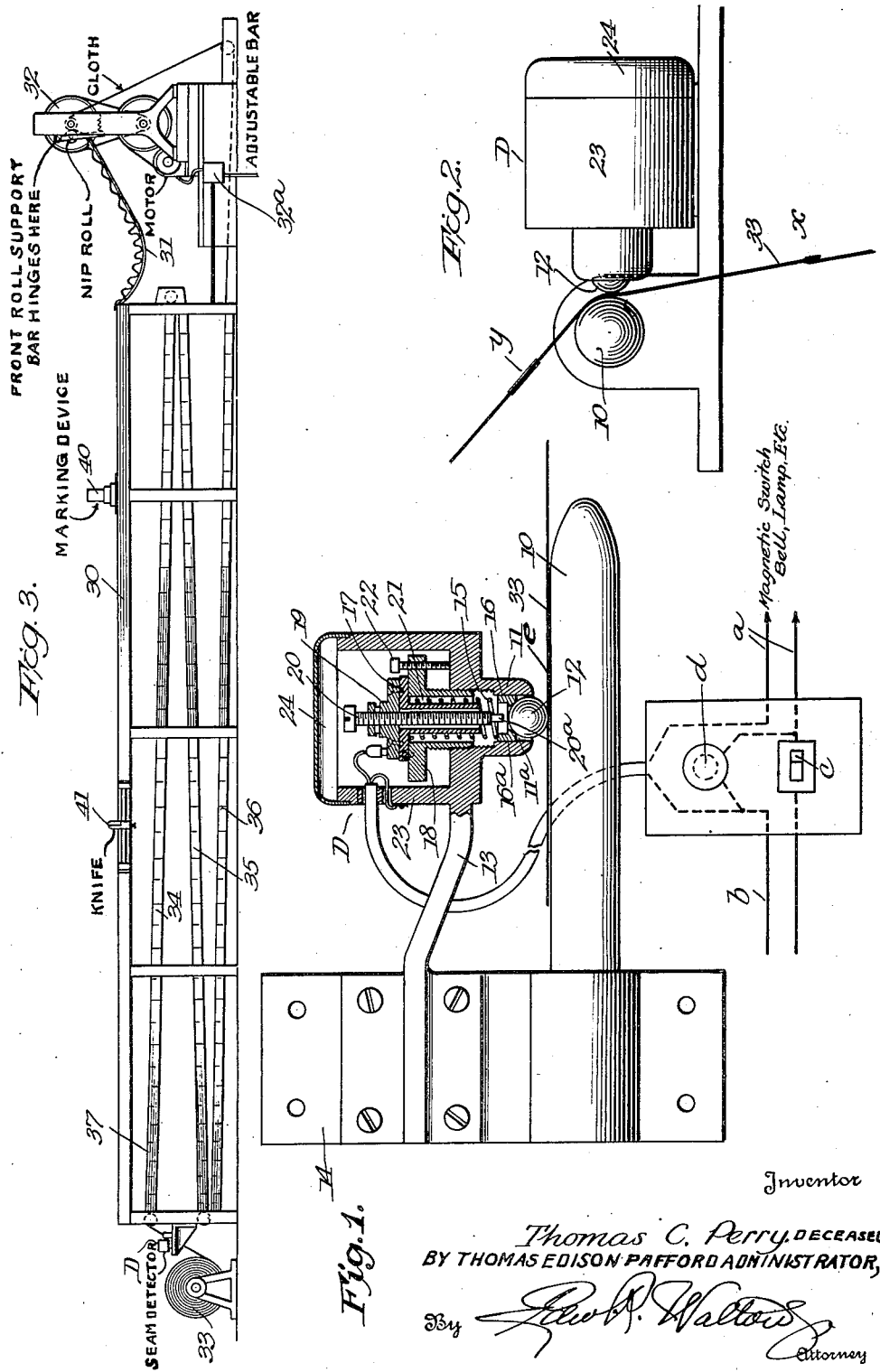
Inventor
Thomas C. Perry, DECEASED
BY THOMAS EDISON PAFFORD ADMINISTRATOR,
By
Attorney Aug. 31, 1937.  T. C. PERRY  2,091,522
SEAM OR DEFECT DETECTOR FOR SHEET MATERIAL
Filed July 30, 1936  2 Sheets-Sheet 2
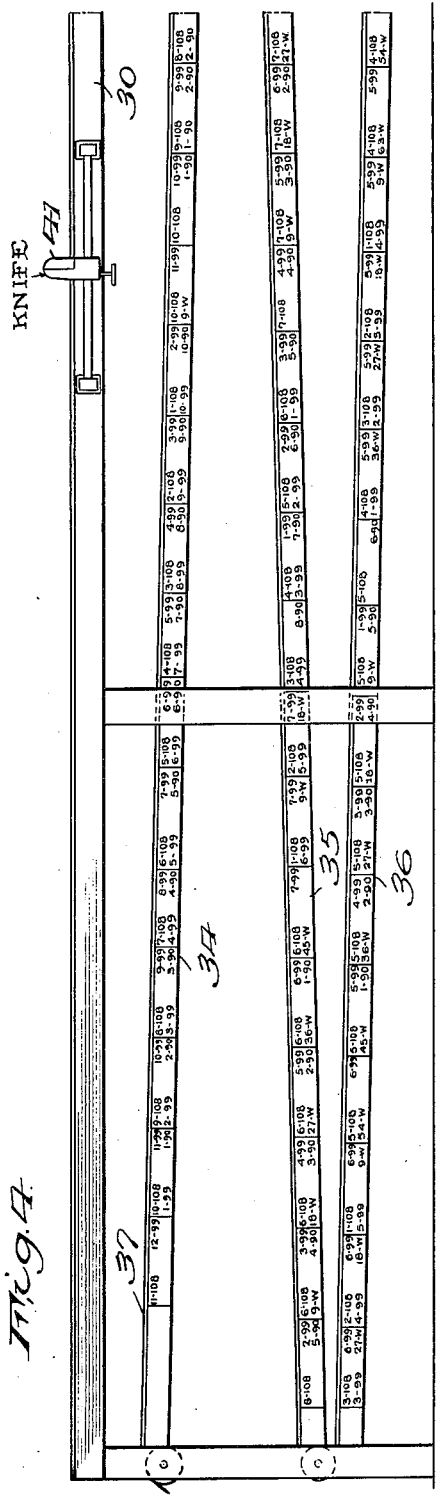
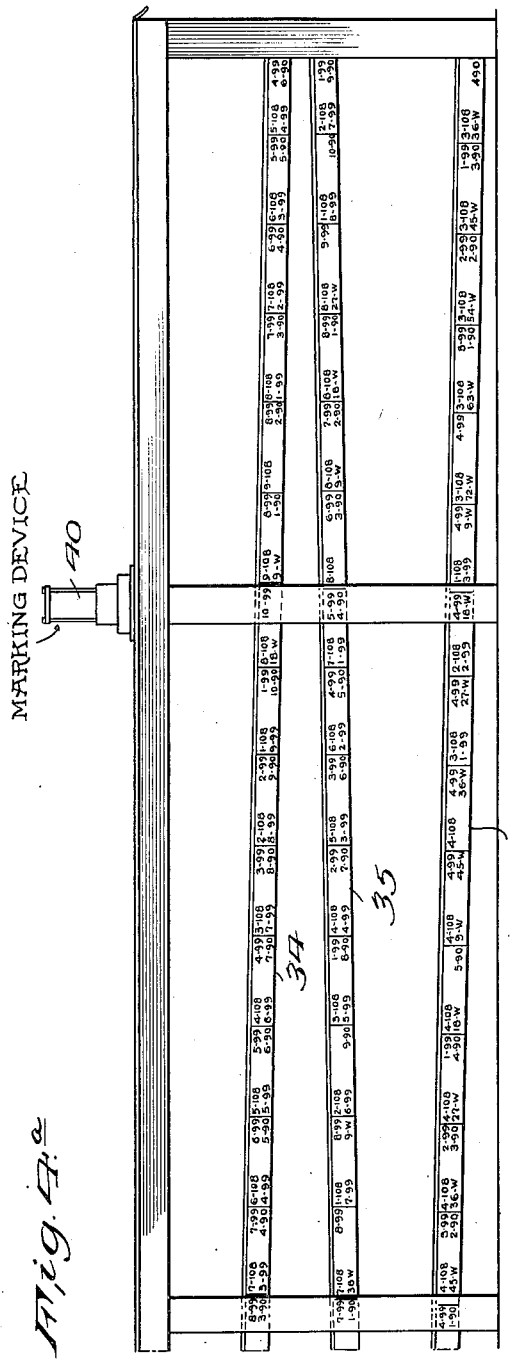

Patented Aug. 31, 1937

2,091,522

UNITED STATES PATENT OFFICE 2,091,522

SEAM OR DEFECT DETECTOR FOR SHEET MATERIAL

Thomas C. Perry, deceased, late of Sand Springs, Okla., by Thomas Edison Pafford, administrator, Sand Springs, Okla., assignor by decree of distribution to Marion B. Perry, widow Application July 30, 1936, Serial No. 93,529

4 Claims. (Cl. 33—135)

The present invention is a detector device, useful in connection with sheet material for detecting seams or defects in the sheet materials and controlling a stopping or an actuating mechanism, and/or for giving an alarm or indication of some sort of the operation of the detector.

While the above invention is susceptible of very general use, it is particularly adapted for use in connection with the measuring of sheet material of predetermined lengths free of defects or seams.

An object of the present invention is the provision of a detector of the above stated character which is very simple in operation; may be readily adjusted to meet varying needs; has few operating parts which may become worn or inoperative; is very sensitive to slight variations in thickness of the sheet material; and is durable and very cheap to manufacture.

Another object of the invention is the provision of a detector of the above stated character, in connection with a measuring table over which a sheet material is drawn and severed in predetermined lengths, so that when a seam or defect has been detected, an indication will be given, or the sheet feeding mechanism stopped, in order that when the position of the seam or defect has been located, the number of unit lengths of predetermined size best obtainable from the material between the edge and seam or defect can be determined from a scale on the table.

With the above and other objects in view, the invention further resides in the sundry details of construction of the detector and in the combination of the arrangement of parts, hereinafter described and pointed out in the appended claims.

In the drawings which show the preferred embodiment of the invention as at present devised:—

Fig. 1 is a plan view of the detecting device with parts in section so as to show the detail construction of the operating mechanism;

Fig. 2 is an end view of the detector shown in Fig. 1;

Fig. 3 is a side view of a sheet measuring table or apparatus equipped with the detector; and Figures 4 and 4a are enlarged fragmentary views of the table shown in Figure 3, Figure 4 being one-half of the table and Figure 4a being the other half of the table, respectively, and showing the scale indications which may be employed.

The detector device per se comprises an arm or anvil 10, preferably circular in cross-section, over or around which a strip of sheet material may pass. Positioned adjacent the arm 10 and spaced slightly therefrom, is a socket member 11 in which is disposed a detector member 12, which bears against the surface of the anvil or arm 10 between which and the detector the sheet material passes. This detector member 12 may be any element having a smooth surface, so as not to hinder or in any way injure the material passing between it and the arm 10, but it is preferred that it be a metallic ball. The socket member 11 may comprise any suitable element having a bore 11a therein, the bore being of such dimensions that the detector member 12 has a sliding fit in the lower end thereof, from which the detector member normally partially projects into engagement with the arm 10. The socket member is supported in position by an arm 13, which, together with the arm 10, is fastened to or supported by a bracket 14, which may be secured in position as the necessity or the requirements of use may indicate.

The detector member or ball 12 is normally held in contact with the arm 10 by a coil spring 15, disposed in said socket bore 11a and having one end pressing against a follower 16, slidably disposed in the lower end of the socket and bearing against the detector member 12, while its other end bears against an insulating washer or disc 17, secured on a flange bushing 18 threaded into the upper end of the socket 11 and enclosing the spring 15.

Superposed upon the insulating disc 17 is a metallic plate 19 of electro-conductive material, which has a threaded central opening therein in which is threaded an adjustable contact screw 20, also of electro-conductive material. The contact screw 20 is of such length that it may be extended down in close proximity to the detector member 12. The follower 16 has an opening 16a therein through which the lower extremity 20a of the contact screw may extend to be engaged by the detector member 12, when the latter is moved inwardly into the socket 11a. The contact member 20 is preferably surrounded by an insulating sleeve 21 disposed between it and the spring 15. This insulating sleeve may be provided as a tubular extension from the insulating disc 17 and will serve to insulate the contact member 20 from contact with the spring and also will serve as a guide for the spring.

The pressure to be exerted by the detector member 12 on the arm 10, or the material which passes between them, may be obtained and regulated by a threaded adjustment of the bushing 18 in the socket 11, this adjustment being rendered fixed by a locking screw 22, threaded in a flange of the bushing 18 and bearing on the stationary part of the socket 11, or by any other suitable means. This adjustment of the bushing 18 exerts or relieves pressure on the spring 15 and, consequently, upon the detector 12.

The parts 18, 19, and 20 may be enclosed, as shown in the drawings, by a housing 23, which rises from and is preferably integral with the arm 13. The housing 23 may be covered by a removable top closure 24, so as to permit access to the parts for the purpose of adjustment.

The device just described is designed to open and close an electric circuit $a$ which may control any operating device, such as an electric motor, a switch, bell, lamp, or other indicator. This circuit is fed from any desirable source of supply $b$, and is controlled by a master switch $c$. A pilot light $d$ may be shunted across the switch $c$ for the purpose of indicating when the switch $c$ is on or off. The detecting device of the present invention is in series in the circuit $a$ (to a motor control switch, or lamp, or bell or other indicator), as shown in Fig. 1, and has one end of the circuit conductor connected with the plate 19 and the other with the housing 23. Thus it will be seen that the current in the circuit passes through the plate 19, contact member 20 and, when the detector member 12 is in contact therewith at 20$^a$, through the follower 16 and detector member 12 to the housing 23, back to the conductor.

An adjustment of the contact screw 20 in the plate 19 varies the distance between the contact end 20$^a$ and detector member 12 so that the electric circuit may be opened and closed by varying degrees of thickness of the material passing between the arm 10 and the detector member 12. The sensitivity of this device is therefore, controlled by the two adjustments, namely, the pressure exerted upon the spring 15 and the position of the contact 20$^a$ with respect to the detector 12.

This double adjustment is desirable because in some uses, such as with fine fabrics, it may not be desirable to have a detector member exert much pressure upon the fabric, or conversely, while at the same time the character of the material or the thickness thereof may be such as to require further adjustment of the contact member 20, for the proper detecting operation of the device.

It has been previously stated the invention is particularly adapted for use in connection with a measuring device for flexible sheet material. In Fig. 3 is shown a measuring table or support 30 over which sheet material may be drawn, preferably by hand, from a crib 31. On the table 30 is a marking device 40 and a cutting device 41, relatively adjustable along the length of the table so that they may be adjusted with respect to each other to the lengths in which it is desired to measure and/or sever the sheet material. When a desired length of the sheet material has been cut by the device 41, the marker 40 is caused to operate to mark the sheet material at the point where the sheet is to be next severed, for the desired length to be obtained. The marking mechanism 40 and the cutting mechanism 41 are set forth in detail in my copending application, Serial Number 93,528, filed July 30, 1936.

The sheet material or stock is fed into the crib 31 in an accumulation of loose folds by a feeding mechanism 32. This feeding mechanism, disposed at one end of the table, draws the sheet material from a suitable supply or roll 33, positioned at the other end of the table, over one or more decks 34, 35, 36, arranged underneath the table. Positioned preferably at the point where the sheet material enters the first deck 34 from the supply 33, is the detector device D, above described. In Fig. 2 is shown the position which the detector device assumes in the combination shown in Fig. 3, with respect to the material being fed from the roll 33. This sheet material may be made up of a plurality of strips joined together at their adjacent ends forming a seam, as shown at $x$, or the sheet material may have been torn or otherwise damaged, which may be marked by a flag $y$, or other suitable indicator placed on the surface of the material, preferably at the marginal edge portion $e$. This flag $y$ may be an adhesive plaster or strip of sufficient thickness to operate or depress the detector 12. As the material passes between the arm 10 and the detector 12, the thickness of the seam $x$ or the flag $y$ will move the detector 12 inwardly of the socket 11$^a$ to engage the contact 20$^a$ and close the circuit $a$ to stop the feeding mechanism 32, through operation of the switch 32$^a$ (preferably a magnetic switch) in the circuit $a$ (Figures 1 and 3).

Along the edge, or otherwise associated with the decks 34, 35, and 36, is a scale, 37. The position of the seam or flag with respect to the scale 37 will indicate to the operator the number of units of desirable lengths into which the sheet material can be best severed, between the free end of the sheet material and the seam or defect.

Assuming that the sheet material is being drawn over the decks 34, 35, and 36 by the feeding mechanism 32 and that there is no defect occurring in the sheet material from the cutter 41 back to the supply roll 33, when a defect is encountered by the detector $d$, the switch 32$^a$ will be operated stopping the motor of the mechanism 32 (or other signal or indication being given). The operator then becomes informed that a defect has entered the apparatus and is at least in the first scale division on the deck 34. Upon finding the defected portion on the deck, the operator may read from the scale, for instance, (if the defect is within the 1st division) that 11 sheets of 108 inches long or 12 sheets of 99 inches long can be obtained from the material extending from the point where the scale is read to the cutting station 41, or other suitable indication mark on the measuring table. Again starting the feeding mechanism 32 (through suitable means not shown) the sheet material will be further drawn over the decks until another defect is encountered.

Assuming, further, that another defect is encountered before the first defect above mentioned has reached the cutting station (or been "torn out"—as stated in the trade vernacular), the same operation, as above mentioned, takes place and the operator will know that there is another defect on the table. However, he proceeds "tearing out" sheet lengths until the first defect has been reached at the cutting station 41, then he will inspect the decks for the second defect, which has occurred, and through the aid of the flag $y$ will determine its location on the decks. Upon locating this said second defect on the decks, he will then be able to read the scale opposite its location to ascertain the number of different lengths of sheeting that can be obtained out of the sheeting from the end of it at the knife station 41 to the point on the scale where the defect is located. The cutting tables, now in use, are constructed so that there will be 23 yards or 828 inches from the beginning of the scale on deck 34 to the end of the scale on deck 36 and there further being 10 yards or 360 inches from the end of the scale of the deck 36 around through the feeding mechanism to the cutting knife 41, making 33 yards or 1188 inches from the beginning of the scale to the cutting station 41. Of course, these dimensions are only given by way of example, and may be increased or decreased according to convenience or requirements. On the scale the letter $w$ indicates waste and, wherever this letter is found preceded by a number, means that there will be that many inches waste when sheeting of a certain length is attempted to be cut when the defect is in that division of the scale. For instance, at the end of the deck 36 occurs 3—108 overlying 36$^w$ which means that, if the defect is in that division of the scale, 3 sheets 108 inches long can be obtained with 36 inches waste. However, it will also be noted that in the same division 4 sheets 90 inches long can be obtained without any waste.

The detector is shown in Fig. 3 as placed at the end of the measuring apparatus receiving the sheet material, from the supply source; but the device may be located at any desired point along the deck or decks 34, 35, and 36.

Also, it is to be understood that the detector device is not limited to use with the measuring device shown and described, but is susceptible of general application either along, or in combination with other devices, and therefore, it is not wished to be limited in the application and use thereof. By the term "defect" as may appear in the claims, it is meant seams, or other defects which will cause the detector member 12 to actuate an indicator.

What is claimed is:

1. In an apparatus for measuring sheet material, scaled surfaces along which said material is drawn, an operator's cutting station on the table, means for detecting defects in said sheeting moving to said scaled surfaces, means for indicating to the operator the detection of said defects whereby the position of the defected portions of the sheet material within the apparatus may be ascertained with respect to said scale.

2. In an apparatus for measuring sheet material, a measuring table, an operator's cutting station on the table, a deck beneath said table over which material to be measured passes, operable means at one end of the table for drawing the material to be measured over said deck, defect detecting means in the path of said material passing along said deck, an operable connection between said detector means and said sheet drawing means for rendering the latter inoperative when a defect is detected, and a scale on said deck with which said defect may cooperate in indicating the number of unit lengths obtainable from the sheet material between the cutting station and said defect.

3. In a measuring and cutting table for sheet material, an operator's cutting station on the table, means for drawing the sheet material from a source of supply, a seam or defect detector positioned along the length of the drawn sheet, and means cooperating with the detected defects for indicating the number of lengths of sheeting of determined lengths obtainable from the drawn sheeting between a defect and the cutting station.

4. In a measuring and cutting table for sheet material, a source of supply of sheet material to be drawn along the table, a cutting station on the table, a seam or defect detector positioned between the source of supply and said cutting station, and means for drawing the sheet material from the source of supply toward the cutting station, and means between the defect detector and cutting station cooperating with the seam or defect in the sheet for indicating the number of lengths of sheeting of determined lengths obtainable from the drawn sheeting at various points between said defect detector and the cutting station, and means operated by the defect detector for indicating the detection of the seam or defect.

THOMAS EDISON PAFFORD,
*Administrator of the Estate of Thomas C. Perry, Deceased.*